United States Patent Office 3,130,841
Patented Apr. 28, 1964

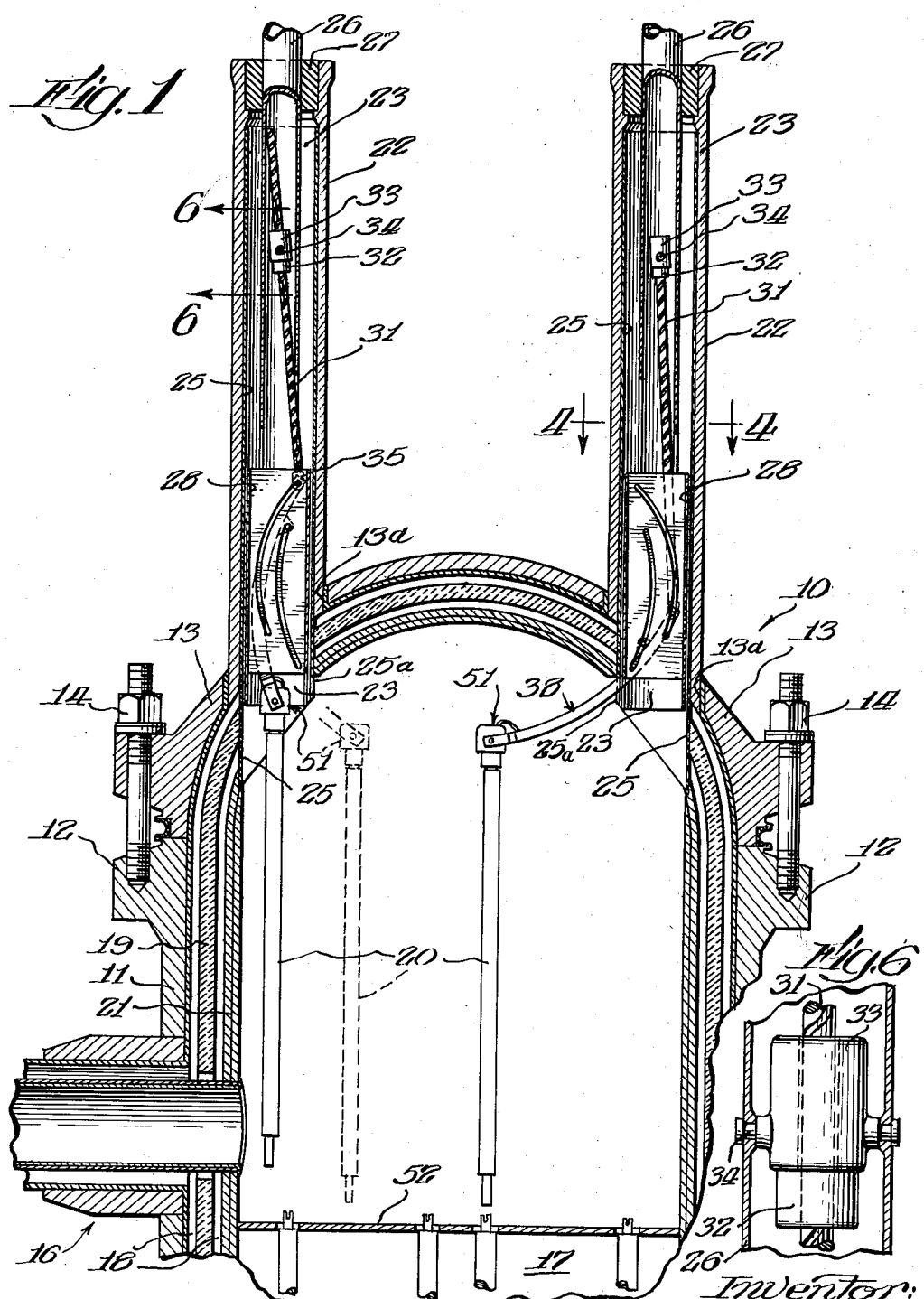

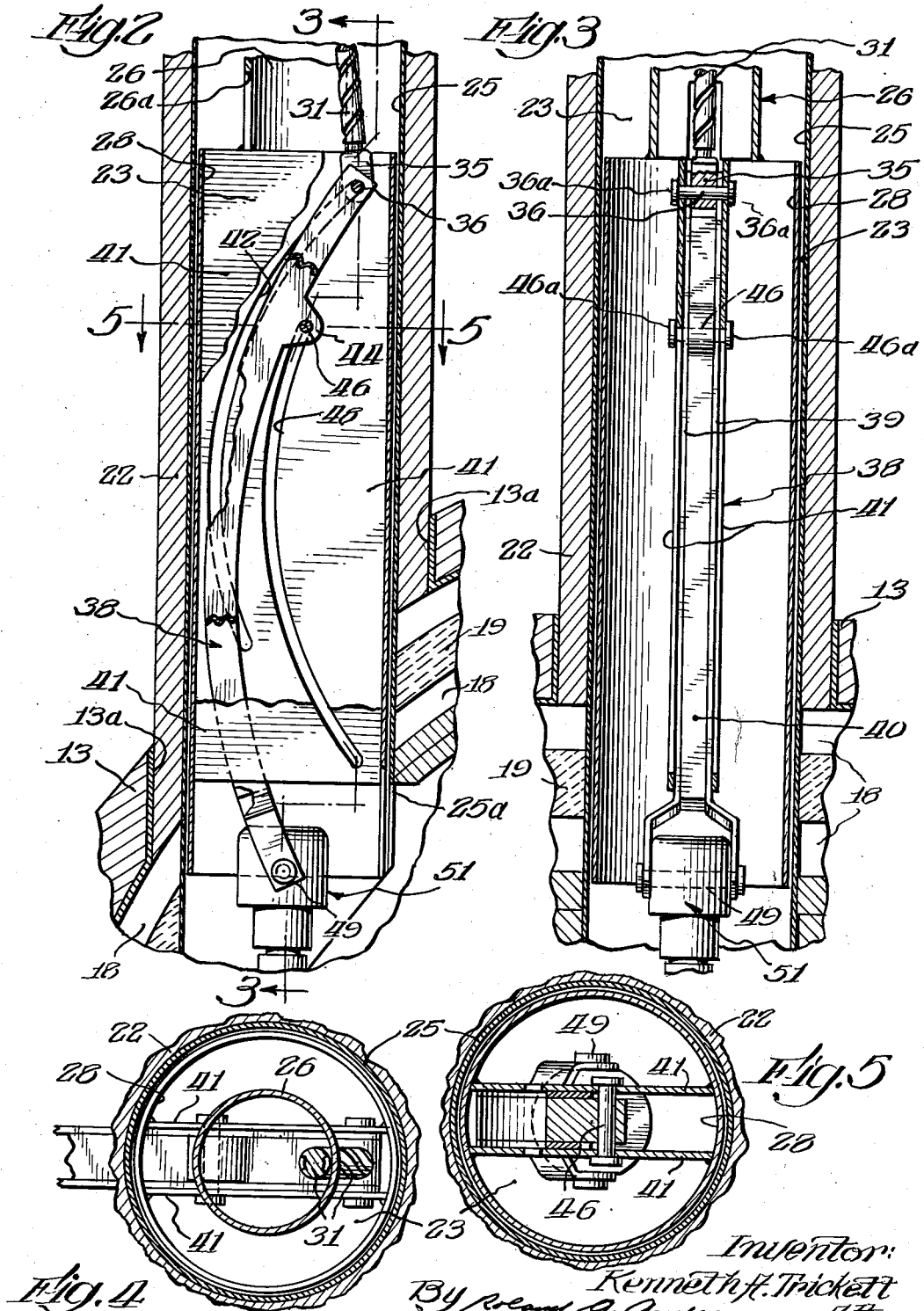

3,130,841
ARTICLE HANDLING DEVICE
Kenneth A. Trickett, San Diego, Calif., assignor, by mesne assignments, to the United States of America as represented by the United States Atomic Energy Commission
Filed Oct. 10, 1962, Ser. No. 229,770
4 Claims. (Cl. 214—28)

This invention relates to article handling devices and more particularly, to devices for effecting the insertion and withdrawal of components within a confining enclosure in response to the actuation of remote control means.

Numerous experimental, training and production facilities have been developed which require the utilization of remotely controlled devices for effecting the handling of various components within a confining enclosure. One example of such a facility is a nuclear installation employing a gas-cooled or other form of neutronic reactor. Generally, the reactors employed in such nuclear facilities include, among other things, a pressure vessel structure that serves as a confining enclosure for a reactor core wherein fuel elements, control rods, etc. are disposed and maintained. It is conventional to provide a plurality of entry ports or access openings in the pressure vessel to facilitate the handling of the various core components therein.

In this latter connection, the loading and unloading of fuel elements and other core components is effected throughout the life of the reactor so that the efficient operation thereof can be sustained. To accomplish these operations, various loading and unloading devices have been developed that are designed to handle individual components within the pressure vessel. For the most part, these devices require a number of access openings in the pressure vessel which can lead to the pressure vessel structure being weakened. Attempts to eliminate the need for individual handling devices for each of the core components contained within the reactor vessel have led to modifications in the design of the pressure vessels to accommodate these devices. In this connection, devices that have heretofore been designed to operate over a substantial area of the core are rather complex structures requiring both a large area in which to operate and special modifications in the pressure vessel structure so that these devices can be placed into and removed from the vessel.

It is the prime object of the present invention to provide an improved article handling device that can readily effect the insertion and withdrawal of components within a confining enclosure in response to the actuation of remote control means.

Still another object of the present invention resides in the provision of an improved article handling device which can effect the placing of components into and the withdrawal of components from a confining enclosure through a single opening provided therein.

A further object of the present invention resides in the provision of an improved article handling device, the operation of which is characterized by essentially straight line motion so that the device requires a minimum of space within which to effect the accurate withdrawal and/or positioning of components within a confining enclosure.

A more finite object of the present invention resides in the provision of an article handling device that can be readily utilized in conjunction with neutronic reactors and the like without the need for substantial modifications in the structural features thereof.

An additional object of the present invention resides in the provision of an article handling device which is relatively inexpensive to construct and which is reliable in operation.

Other objects and advantages of the present invention will become apparent from the following detailed description of one preferred embodiment thereof when considered in conjunction with the accompanying drawings wherein:

FIGURE 1 is a vertical cross sectional view through a portion of a neutronic reactor that is adapted with one preferred embodiment of the article handling device of the present invention;

FIGURE 2 is an enlarged fragmentary cross sectional view illustrating a major portion of the article handling device illustrated in FIGURE 1;

FIGURE 3 is a vertical cross sectional view taken along the line 3—3 in FIGURE 2;

FIGURE 4 is a horizontal cross sectional view taken along the line 4—4 in FIGURE 1;

FIGURE 5 is a horizontal cross sectional view taken along the line 5—5 in FIGURE 2; and FIGURE 6 is an enlarged fragmentary vertical cross sectional view taken along the line 6—6 in FIGURE 1.

The article handling device of the present invention is designed for utilization in any of the numerous facilities wherein it is desired to effect the handling of components within a confining enclosure by the actuation of remote control means. However, to facilitate a complete understanding of the present invention, one preferred embodiment of the article handling device will be hereinafter described when employed with a nuclear reactor to effect the placement of core components into a pressure vessel and the withdrawal of components therefrom.

In general, one preferred embodiment of the article handling device of the present invention includes a pair of guide plates that are stationarily mounted within a tubular housing. The housing is movably positioned within a suitably proportioned entry port that communicates with a confining enclosure wherein the handling device is to be operated by actuation of remote control means. The guide plates are mounted within the housing so that a space is defined therebetween which is sufficiently large to permit movement of an arcuate arm assembly therein. The plates are provided with a pair of cam tracks of suitable configuration wherein cam rollers that extend from the arcuate arm assembly are positioned. The location of the cam tracks and the relative position of the cams on the arcuate arm assembly is such that upon movement of the arcuate arm assembly, as guided by the advance of the cams within the cam tracks, substantially horizontal movement of the lower end of the arm assembly is realized.

A grappling mechanism of conventional design is secured to the end of the arcuate arm and is designed to effect the engagement of the components which are to be placed in or withdrawn from the enclosure. Suitable drive means is secured to the arcuate arm assembly to control the movement of the arm relative to the guide plates. In addition, the tubular housing is linked to a suitable member that effects the advance and withdrawal of the housing and associated arcuate arm assembly within the entry port so that the entire article handling device can be selectively placed in and withdrawn from the enclosure.

Referring in particular to FIGURE 1, a pressure vessel 10 is disclosed which is provided with one preferred embodiment of the article handling device of the present invention. As shown, the pressure vessel includes a main pressure vessel housing 11 which is provided with an annular support flange 12 about the uppermost portion thereof. In a conventional manner, the support flange 12 is utilized to support the pressure vessel within a concrete or similar protective confining enclosure (not shown). A dome shaped cover plate 13 is secured in gas tight sealing relation to the support flange 12 by a conventional bolting ring and stud assembly 14.

A concentric outlet and inlet duct assembly 16 communicates with one side wall of the main body portion 12 of the pressure vessel 10. The duct assembly supplies a flow of heat extracting coolant to the pressure vessel 10 which is directed through a cylindrical neutronic reactor core 17 of conventional design mounted therein. The path for coolant flow to the core 17 is provided by suitable coolant channels 18 that are defined by the inner wall of the pressure vessel, a thermal shield 19 and a core support barrel 21 that are mounted in concentric spaced relation within the pressure vessel 10.

The coolant is circulated through the core and about an array of core components such as control rods and fuel elements generally designated by the numeral 20 that are disposed within the core structure in a conventional manner. A plurality of cylindrical entry port defining members 22 are secured to the dome shaped pressure vessel cover 13 in alignment with suitably proportioned apertures 13a provided therein. Each of the members 22 extends upwardly from the apertures 13a and defines an elongated cylindrical entry port 23 which communicates with the inner region of the pressure vessel above the reactor core 17.

In FIGURE 1, an article handling device of the present invention is shown positioned within each of the two entry ports defined by the members 22. However, it should be understood that a single article handling device could be utilized for the entire reactor core merely by relocating the device in the appropriate entry port 23 when it is desired to effect the handling of core components in a particular quadrant of the cylindrical core 17. Alternatively, a single handling device could be positioned within an entry port located on the central axis of the pressure vessel.

In the illustrated embodiment each article handling device includes a telescoping mast 26 that extends downwardly through a removable cylindrical shielding slug 27 that is positioned in gas tight relationship within the upper extremity of the cylindrical port defining member 22. The mast is slidably positioned within the removable shielding slug 27 so that desired rotational and vertical movement thereof can be readily effected, as hereinafter described.

The mast 26 is preferably a hollow tubular member which has the lower end portion thereof joined to the upper extremity of a tubular housing 28 of larger diameter that fits within the fuel port 23. In this connection, a cylindrical liner 25 is fixedly mounted within the cylindrical fuel port defining member 22 and extends downwardly from just below the shielding slug 27 through the aperture in the cover plate 13 that communicates with the entry port 23. The liner 25 provides a low friction surface along which the tubular housing 28 can be advanced under the influence of and in response to the movement of the mast 26 and wherein the tubular housing can be rotated.

As shown in FIGURES 1 and 6, a suitably threaded ball screw 31 is confined within the telescoping mast 26. The ball screw 31 extends upwardly through a conventional motor driven ball nut 32 that is connected to an apertured drive motor 33 of a conventional type wherethrough the ball screw 31 also extends. The ball nut 32 has the ball screw 31 threaded therein so that rotary motion imparted to the ball nut by the motor 33 results in the ball screw being raised or lowered. A pivot pin 34 extends from the motor housing and is secured to the wall of the telescoping mast 26. The pivot pin precludes vertical movement of the motor and ball nut but allows pivotal movement thereof during the upward and downward advance of the ball screw, as hereinafter described.

Referring to FIGURES 2–5, the lower extremity of the ball screw 31 is secured to a suitable coupling element 35 wherethrough a cam member 36 extends. The cam member 36 pivotally links the coupling element to an arcuate arm assembly 38 including a pair of arcuately shaped arms 39 separated by and joined to an arcuately shaped solid spacer element 40. The cam member 36 passes through and has enlarged end portions 36a maintained in contact with a pair of slotted rectangular guide plates 41. The guide plates 41 are secured within the tubular housing 28 in parallel relation as by welding. Accordingly, a spaced region is defined between the parallel guide plates wherethrough the arm assembly 38 is advanced in response to linear movement of the ball screw 31. In addition, the lower extremity of the mast 26 is welded at two locations (FIGURE 4) to each of the guide plates so that vertical and/or rotary movement of the mast 26 effects corresponding movement of the housing 28 whereto the guide plates are secured.

As shown in FIGURES 2 and 3, the central portion of the cam member 36 extends through the aligned apertures provided in the upper extremity of the assembly 38 and in the coupling element 34. The cam member 36 also extends through aligned arcuately shaped cam tracks 42 formed in the guide plates 41 so that the enlarged end portions 36a thereof bear against the outer surfaces of the plates 41 adjacent the cam tracks provided therein.

A projecting segment 44 extends from the inner arcuate surface of each of the arms 39 and is apertured to receive a cam member 46. The cam member 46 has a central portion that extends through a second pair of aligned arcuately shaped cam tracks 48 provided in the guide plates 41 and has enlarged end portions 46a which bear against the outer surfaces of the plates adjacent the cam tracks. In practice, the arm assembly 38 may be mounted between the guide plates by employing cam members 36 and 46 that are formed from headed pins or rivets that have a second enlarged end portion provided therefor after the positioning of the arm assembly between the guide plates. Accordingly, the arcuate arm assembly is confined between the guide plates 41 by the cam members 36 and 46 but is free to move relative thereto.

Any movement imparted to the arcuate arm assembly 38 through the coupling element 34 results in the arms being advanced along the path defined by the cam tracks 42 and 48. In addition, since the upper extremity of the arm assembly 38 is pivotally linked to the coupling element 34, the advance of the arm assembly results in the motor 33 and ball nut-ball screw assembly being pivoted within the telescoping mast 26 to accommodate this movement. To accommodate the pivotal movement of the ball screw 31, the lower portion of the mast 26 (FIGURE 2) that is welded to the tubular housing 28 has apertured portions provided therein. Similarly, the lower extremity of the liner 25 has an apertured portion 25a provided therein to accommodate the full advance of arm assembly 38 from without the tubular housing 28.

As shown in FIGURE 3, the lower extremity of each of the arms 39 which extend beyond the lower end of the spacer 40 are formed in an expanded fork-like configuration. The additional spacing provided between the arms at this location allows a grappling head mechanism 51 to be positioned therein by a coupling pin 49 that extends through the grappling head and is secured at the opposite ends thereof to the lower fork-like portions of the arms 38. The grappling head 51, which may be any one of several commercially available types, is positively linked in this fashion to the lower extremities of the arcuate shaped arm 39 so that the grappling head is advanced with the arcuate arm assembly.

The manner in which the desired movement of the arm assembly is accomplished will best be understood from a consideration of the structural relationship between the arcuate arm assembly 38 and the arcuately shaped cam tracks 42 and 48. In this connection, the radius and length of the arcuate arm assembly are selected so that a desired area of the core is made accessible to the grappling head 51 with a minimum of vertical movement thereof in response to the actuation of remote control means. In addition, the arcuate arm assembly 38 is proportioned to insure that the arm assembly can be fully withdrawn within the tubular housing 28, as shown in the left hand portion of FIGURE 1.

Both minimum and maximum requirements are imposed on the size and configuration of the arcuate arm assembly 38 and the cam tracks 42 and 48. More particularly, a minimum limit on the radius of the arcuate arm assembly 38, consistent with the length necessary to cover the desired area of the core, is imposed by the inner diameter of the tubular housing 28. This limitation exists since it is desired to fully withdraw the arm assembly within the tubular housing as previously described. A maximum radius, consistent with the desired substantially horizontal motion, is imposed by the requirement that substantially all of the downward motion imparted to the arm assembly is translated into horizontal straight line motion. That is, the vertical motion of the grappling head should be minimized and should be confined to the initial period of the arcuate arm assembly advance.

Having selected the length and radius of the arcuate arm assembly 38 consistent with these conditions, the length and radius of the cam tracks 42 and 48 are selected so that the aforedescribed requirement are substantially straight line motion of the grappling head is achieved while at the same time the desired area of core coverage is permitted. More specifically, a first of the cam tracks, preferably the lower cam track 48 (FIGURE 2), is provided in each of the guide plates 41 and constitutes an arc formed by a segment of a circle having a radius substantially smaller than the radius of the arcuate arm assembly 38. The center of curvature of each of the arcuate cam tracks 48 is located between the upper and lower limits for the travel of the cam member 46 which is positioned therein as previously described. The position of the cam member 46 on the arm assembly is such that the upper end of the arm assembly can move within the telescoping mast 28 without engaging the wall thereof.

Thereafter, the length, arcuate configuration and location of the upper cam tracks 42 in each of the guide plates 41, wherein the cam member 36 is positioned are selected so that the major portion of the advance of the lower end of the grappling head is characterized by substantially horizontal straight line motion. More particularly, the configuration and location of the upper cam tracks 42 are selected so that upon downward motion being imparted to the arm assembly, the grappling head passes down and out from the tubular housing 28 and subsequently is advanced along a substantially horizontal path.

When it is desired to remove a core component, for example a fuel element 20 from the core 17, the telescoping mast 26 is advanced downwardly through the fuel port 22 from a location (not shown) above the pressure vessel 10. Accordingly, the motor driven ball nut 32, ball screw 31, tubular housing 28, arcuate arm assembly 38 and grappling head 51 are also moved downwardly through the fuel port. The entire article handling assembly is lowered to a location just above an upper cover plate 52 for the reactor core 17. At the same time, the telescoping mast is rotated in the direction of the component to be engaged so that the grappling head 51 is aligned therewith.

The downward movement and rotation of the article handling device is controlled so that the grappling head is positioned a sufficient distance above the cover plate 52 to allow the free and unrestricted movement of the arcuate arm assembly 38 and associated grappling head 51 relative thereto and into alignment with the selected component that is to be withdrawn from the core. When the telescoping mast has been properly positioned in spaced relationship above the core plate 52 and in alignment with the fuel element 20, the motor 33 is energized by power supplied thereto from an external control circuit through suitable power conductors (not shown). Rotary motion imparted to the ball nut 32 by the motor effects a threading of the ball screw 31 therein so that the rotary motion is translated into downward linear motion of the ball screw within the telescoping mast.

The downward advance of the ball screw 31 imparts a force through the coupling element 34 to the arcuate arm assembly 38. As a consequence, the arm assembly is advanced downwardly, and the cam members 36 and 46 move through the cam tracks 42 and 48 in the guide plates 41. Because of the selected arcuate configuration of the tracks and the complementary arcuate configuration of the arm assembly 38, the downward advance of the grappling head 51 secured to the arm assembly is limited to approximately the initial ten percent of its travel. Thereafter, the grappling head undergoes substantially horizontal motion for the remaining ninety percent of its travel, assuming that it is to be fully extended from the housing 28.

This substantially horizontal movement is continued until the grappling head is positioned in alignment with the fuel element 20 to be removed from the pressure vessel. Accurate positioning of the grappling head relative to selected core component within the reactor core is preferably controlled from an external control console (not shown). However, auxiliary viewing equipment can also be utilized to allow guidance and inspection of the article handling device during operation within the pressure vessel 10.

When the grappling head is aligned with the selected fuel element 20, the telescoping mast is moved downwardly and into locking engagement with the end thereof that extends above the cover plate 52. Accordingly, the grappling head locks onto the upper extremity of the component to be removed. Thereafter, the withdrawal of the telescoping mast 26 through the entry port is initiated by advancing the mast upwardly a sufficient distance to insure that the lower extremity of the component engaged by the grappling head has been withdrawn from the core and clears the cover plate 52 as shown in the right hand portion of FIGURE 1. The motor 33 is then energized so that the ball nut 32 effects the upward advancement of the ball screw 31. As a consequence, the arcuate arm assembly is withdrawn along the cam tracks 42 and 48 to a position within the tubular housing 28 and the core element engaged by the grappling head is positioned in alignment with the entry port defined by the cylindrical port defining member 22.

Finally, the shielding slug 27 is removed and the entire telescoping mast and the associated article handling device are withdrawn from the entry port through a suitable transfer unit (not shown) which allows the removal of the components from the pressure vessel without exposing the radioactive components to the surrounding environment. The aforedescribed operations are reversed when it is desired to effect the insertion of components within the core 17 of the reactor.

From the foregoing it should be apparent that the present invention provides an improved article handling device for effecting the handling of various components with a confining enclosure by the actuation of remote control means. Various modifications might be made in the structural features of the article handling device without deviating from the invention as set forth in the following claims.

What is claimed is:

1. An article handling device which comprises an elongated tubular housing, a pair of substantially parallel spaced-apart planar guide members disposed lengthwise within and secured to said tubular housing so as to define a spaced region therebetween, said guide members having respective members of a first and of a second pair each of congruent, coextensive, spaced-apart, laterally-aligned, arcuately shaped guideways provided therein the radial center of curvature of each said guideway being located at a longitudinal station between those of the extremities of that guideway, with all said arcuate guideways being convex in the same general direction, and with said second pair of guideways being disposed in a nested, generally side-by-side relationship with, and on the concave side of, said first pair of guideways, an arcuate arm assembly mounted between said guide members and spatially oriented with respect to said guideways such that the portion of said arcuate arm assembly proximate said guide members is convex in said same general direction as that of all of said guideways, said arcuate arm assembly further having two pairs of laterally-aligned projecting portions, each said portion positioned for movement within a respective one of said arcuate shaped guideways and substantially along the longitudinal axis of said housing, said pairs of projecting portions being located at different, substantially-spaced respective stations along the length of said arcuate arm assembly, both said respective stations being proximate a first extremity of said arcuate arm assembly, with the pair nearer said first extremity being positioned for movement within said first pair of guideways, and means for imparting motion lengthwise of said housing to said portion of said arcuate arm assembly proximate said guide members, said arcuate arm assembly thereby being adapted, upon said portion thereof being thus moved lengthwise of said housing, to have its advance, as dictated by the movement of said projecting portions through said arcuately shaped guideways, translated into motion of the free, second extremity of said arm assembly along a path substantially perpendicular to the longitudinal axis of said housing.

2. An article handling device which comprises an elongated tubular housing, a pair of substantially parallel spaced-apart guide plates disposed lengthwise within and secured to said tubular housing so as to define a spaced region therebetween, said guide plates having respective members of a first and of a second pair each of congruent, coextensive, spaced-apart, laterally-aligned, arcuately shaped cam tracks provided therein, the radial center of curvature of each said track being located at a longitudinal station between those of the extremities of that track, with all said arcuate tracks being substantially segments of circles and convex in the same general direction and with said second pair of tracks being disposed in a nested, generally side-by-side relationship with, and on the concave side of, said first pair of tracks, an arcuate arm assembly positioned between said guide members and spatially oriented with respect to said tracks such that the portion of said arcuate arm assembly proximate said tracks is convex in said same general direction as that of all of said tracks, said arm assembly having two pairs of laterally-aligned cam members projecting therefrom, each said cam member being mounted for movement within a respective one of said arcuate shaped tracks and substantially along the longitudinal axis of said housing, said pairs of cam members being located at different, substantially-spaced respective stations along the length of said arcuate arm assembly, both said respective stations being proximate a first extremity of said arcuate arm assembly, with the pair nearer said first extremity being positioned for movement within said first pair of tracks, and drive means secured to said first extremity of said arm assembly for imparting motion thereto lengthwise of said housing, said arcuate arm assembly thereby being adapted, upon said first extremity thereof being thus moved lengthwise of said housing, to have its advance, as dictated by the movement of said cam members through said arcuately shaped cam tracks, translated into motion of the free, second extremity of said arm assembly along a path substantially perpendicular to the longitudinal axis of said housing.

3. An article handling device for effecting the manipulation of components confined within an enclosed housing having at least one entry port provided therein, which device comprises an elongated tubular member mounted substantially vertically within the entry port for movement into and out of the enclosed region defined by the housing, a pair of guide plates secured in aligned spacde apart parallel relation upon the lower extremity of said tubular member, each of said guide plates having two elongated slots of a generally arcuate configuration provided therein in alignment with congruent elongated slots provided in the other of said guide plates, the radial center of curvature of each said slot being located at a longitudinal station between those of the extremities of that slot, with all said slots being substantially segments of circles and convex in the same general direction, and with the second of said two slots in each said plate being disposed in a nested, generally side-by-side relationship with, and on the concave side of, the first of said two slots in that plate, an arcuate arm assembly positioned lengthwise within the region between said aligned spaced apart guide plates, having a larger radius of principal curvature than any of said slots, and being spatially oriented with respect to said slots such that the portion of said arcuate arm assembly proximate said slots is convex in said same general direction as that of all of said slots, two pairs of laterally-aligned cam members each extending from said arm assembly and positioned within a respective one of the slots provided in said guide plates, said pairs of cam members being located at different, substantially-spaced respective stations along the length of said arcuate arm assembly, both said respective stations being proximate the upper extremity of said arcuate arm assembly, with the upper pair being positioned respectively within said first slot in each said plate, thereby affording movement of said arm assembly with and relative to said guide plates, and drive means linked to the upper extremity of said arm assembly for imparting a force thereto to effect the movement thereof relative to said guide plates and along a path defined by said slots provided therein and, in turn, thereby affording substantially horizontal motion of the lower extremity of said arcuate arm assembly.

4. An article handling device for inserting components into and withdrawing components from an enclosed housing through at least one entry port provided therein, which device comprises an elongated open ended tubular member mounted substantially vertcially within the entry port for movement into and out of the enclosed region defined by the housing, a pair of guide plates secured in aligned spaced apart parallel relation upon the lower extremity of said tubular member, each of said guide plates having two cam tracks of a generally arcuate configuration provided therein in alignment with congruent cam tracks provided in the other of said guide plates, the radial center of curvature of each said track being located at a longitudinal station between those of the extremities of that track, with all said tracks being substantial segments of circles and convex in the same general direction, and with the second of said two tracks in each said plate being disposed in a nested, generally side-by-side relationship with, and on the concave side of, the first of said two tracks in that plate, and arcuate arm assembly positioned legnthwise within the region between said aligned spaced apart guide plates, having a larger radius of principal curvature than any of said tracks, and being spatially oriented with respect to said tracks such that the portion of said arcuate arm assembly proximate said tracks is convex in said same general direction as that of all of said tracks, two pairs of laterally-aligned cam members each extending from said arm assembly and positioned within a respective one of the cam tracks provided in said guide plates, said pairs of cam members being located at different, substantially-spaced respective stations along the length of said arcuate arm assembly, both said respective stations being proximate the upper extremity of said arcuate arm assembly, with the upper pair being positioned respectively within said first track in each said plate, thereby affording movement of said arm assembly with and relative to said guide plates, and drive means linked to the upper extremity of said arm assembly for imparting a force thereto to effect the movement thereof relative to said guide plates and along the path defined by the cam tracks provided therein and, in turn, thereby affording substantial horizontal motion of the lower extremity of said arcuate arm assembly as it is extended from and withdrawn into said tubular housing, and grappling means secured to the lower extremity of said arm assembly for engaging components to be placed within or withdrawn from the housing of said arcuate arm assembly with and relative to said tubular member.

References Cited in the file of this patent

UNITED STATES PATENTS 1,306,064    Joy _____ June 10, 1919